July 12, 1932.  C. VAN DER LEUN  1,866,684
LOCKING DEVICE
Filed May 29, 1930
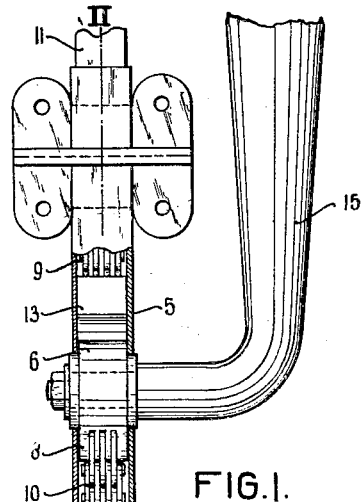
FIG.1.
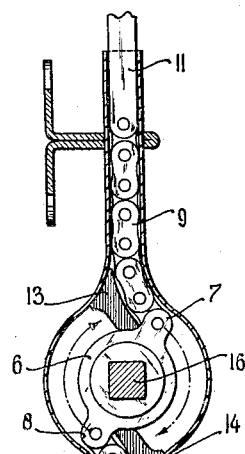
FIG.2.
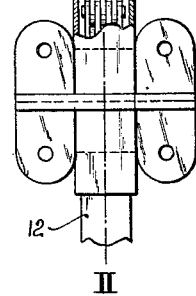
FIG.3.
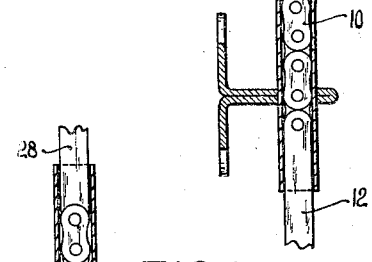
FIG.4.
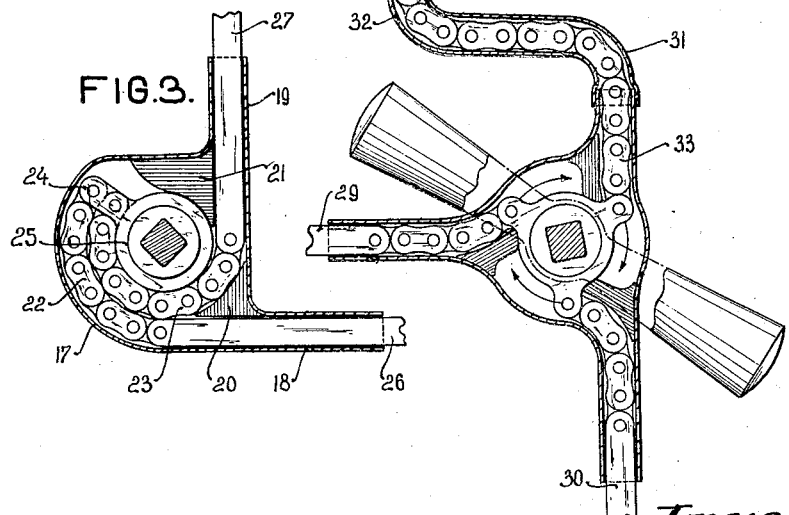
Inventor
C. van der Leun,
By Marks & Clerk
Attys.

Patented July 12, 1932

1,866,684

UNITED STATES PATENT OFFICE

CORNELIS VAN DER LEUN, OF ZEIST, NETHERLANDS

LOCKING DEVICE

Application filed May 29, 1930, Serial No. 457,268, and in Germany June 7, 1929.

This invention relates to locking devices of the kind in which the bolt or each of two or more bolts is adapted to be moved into and out of its operative position by means of a rotatable member or sprocket to which the bolt or each bolt is indirectly attached.

In locking devices of the kind referred to, as at present constructed, the connection between the bolt and the rotatable member is by means of a controlled guide rod which being rigid allows of only a very limited degree of movement of the bolt, since the rotatable member in the most favourable case can only be turned through an angle of 90°. Even in this case the cover or casing of the rotatable member must either be notched or otherwise formed to accommodate the guide rod or rods and in some cases this involves a weakening of the whole construction. A further disadvantage of these guide rods lies in the fact that they must necessarily transmit the movement at an angle to the longitudinal axis of the bolts thereby entailing loss of power and a tendency for the guide rods and bolts to bind in their channels.

The object of the present invention is to obtain a freer and more extended movement of the bolt or bolts and to reduce the dimensions of the device so that it can be applied to a greater variety of uses, including the doors of high class furniture and the like.

A locking device of the kind herein referred to embodying the present invention is characterized in that the movement of the rotatable member or sprocket is transmitted to the bolt, or to each of several bolts, by means of a guided flexible or articulated member which is adapted to act in compression as well as in tension.

The said articulated member may consist of a flat link chain in which adjacent ends of the links are rounded and always in contact with each other. The said articulated member works in a tubular guide which virtually forms an extension of an annular space between the rotatable member or sprocket and its casing so that when the rotatable member is turned in one direction the inner end of the articulated member occupies the said annular space and closely embraces the rotatable member.

In order that my invention may be clearly understood and readily carried into practical effect, reference is made in describing the same to the examples shown in the accompanying drawing, wherein:

Figures 1 and 2 are sectional front and side views respectively of the improved locking device as adapted for the simultaneous operation of a pair of diametrically opposite bolts.

Figures 3 and 4 are views similar to Fig. 2 showing alternative applications of the invention.

In the arrangement shown in Figs. 1 and 2, the casing 5, which encloses the rotatable member or sprocket 6, is of flat circular formation and of relatively small diameter. The sprocket 6 is provided, in this case, with two diametrically opposite radial projections 7, 8 to which the inner ends of flat link chains 9 and 10 are pivotally secured, the other ends of the chains being attached to the bolt rods 11 and 12 respectively.

Guides 13 and 14 are fixed to the casing 5, to guide the chains in their movements into and out of the casing. The sprocket is turned by means of a handle 15 or the like attached to the squared pin 16 on which the sprocket is mounted.

The links of the chain, as seen in Fig. 1, are flat and have rounded ends which touch each other, so that, as the chain bends, the rounded ends roll on one another, and when the chains are in compression there is no wear on the chain rivets the pressure being transmitted direct from link to link. It will now be seen that when the sprocket is turned in a clock-wise direction the chains are both drawn inwardly, their inner ends passing between the sprocket 6 and the casing 5. In this way the bolt rods 11 and 12 are drawn towards each other at the same time and to an equal extent. When, however, the sprocket is turned in the opposite direction, the chains are moved outwardly under compression the bolt rods being thus moved away from each other.

In the arrangement shown in Fig. 3, the casing 17, the casing guides 18 and 19 and the interior guides 20 and 21 are arranged in such a way that both chains 22 and 23 are pivotally attached to a single projection 24 and partly guide one another. In this case, with a sprocket 25 of comparatively small diameter, the bolt rods, which in this arrangement move in direction at right angles to each other, can therefore receive a considerable stroke.

Fig. 4 shows a further application of the invention in which by means of a single rotatable sprocket three bolt rods 28, 29 and 30 can be simultaneously operated. The bends 31 and 32 of the chain 33 show that by a suitable formation of the casing guide the bolt rod 28 may have a more or less optional position.

From the foregoing it will be seen that it is possible to keep the dimensions of the sprocket casing very small whilst at the same time providing the maximum amount of movement for the bolts even where, as in Fig. 3, the chains overlap one another. The sphere of usefulness of a locking device of the kind referred to can therefore by means of this invention be considerably extended so as to be applicable for use in the case of the doors of cupboards, clockworks, switches and the like.

The arrangement of the rotatable sprocket also lends itself to the incorporation therewith of a cylinder lock.

In order to make the movement of the chains as free as possible in the casing guides so that the device can even be operated by means of a simple key, the chain rivets can be provided with roller discs of a slightly larger diameter than the ends of the links.

What I claim is:—

1. In a locking device, a rotatable, substantially circular element, a radial projection on said element, a chain hinged at its inner end to said projection, a locking bolt hinged to the outer end of said chain, a substantially circular casing coaxially enclosing said element and radially spaced therefrom to form with said element a curved channel having a width substantially equal to the radial dimension of said chain, a tubular member secured to said casing and in communication therewith, said member snugly enclosing and guiding said chain and bolt and permitting said chain to act in compression, and a guide piece secured within said casing in the path of said projection to provide an abutment therefor and forming, together with the inner wall of said casing, a smooth transition from said channel to said tubular member.

2. In a locking device, a rotatably, substantially circular element, a radial projection on said element, a plurality of chains hinged at their inner ends to radially spaced points of said projection, the inner chain being adapted to be wound on said element and the outer chain being adapted to be wound on the inner chain, a plurality of locking bolts each hinged to the outer end of one of said chains, a substantially circular casing coaxially enclosing said element and radially spaced therefrom to form with said element a curved channel having a width substantially equal to the radial dimensions of the superposed chains, a plurality of tubular members secured to said casing and in communication therewith, each of said members being adapted to snugly enclose and guide one of said chains with its bolt and to allow the chain therein to act in compression, and a plurality of rigid guide pieces secured within said casing to form, together with the inner wall of said casing, smooth transitions from said channel to said tubular members, one of said guide pieces forming an abutment for said projection.

In testimony whereof I affix my signature.

CORNELIS van der LEUN.